United States Patent [19]

Blonstein et al.

[11] Patent Number: 6,037,933
[45] Date of Patent: *Mar. 14, 2000

[54] TV GRAPHICAL USER INTERFACE FOR PROVIDING USER ACCESS TO PRESET TIME PERIODS OF TV PROGRAM INFORMATION

[75] Inventors: Steve Blonstein, Palo Alto; Jack Chaney, Gilroy; Michael Deacon, Campbell; Kiet Khauv, San Jose, all of Calif.

[73] Assignee: Samsung Electronics Co., Ltd., Suwon, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/749,270

[22] Filed: Nov. 13, 1996

[51] Int. Cl.⁷ .................................. G06F 9/00; H04N 7/16
[52] U.S. Cl. ................................ 345/327; 348/8; 345/352
[58] Field of Search ..................... 345/302, 326, 345/327, 334, 335, 329, 341, 352, 346, 440, 328; 348/2, 7, 8, 10, 4

[56] References Cited

U.S. PATENT DOCUMENTS 5,045,843  9/1991  Hansen ................................. 340/709
5,198,901  3/1993  Lynch .................................... 358/136
5,293,229  3/1994  Iu ......................................... 348/415
5,311,310  5/1994  Jozawa et al. ....................... 348/426
5,359,348  10/1994 Pilcher et al. ........................ 345/158
5,361,105  11/1994 Iu .......................................... 348/699
5,386,234  1/1995  Veltman et al. ...................... 348/409
5,400,076  3/1995  Iwamura ............................... 348/416
5,485,197  1/1996  Hoarty ..................................... 348/7
5,489,947  2/1996  Cooper ................................. 348/589
5,524,195  6/1996  Clanton, III et al. ................ 345/327
5,589,892  12/1996 Knee et al. ............................. 348/8
5,623,613  4/1997  Rowe et al. ......................... 345/353

Primary Examiner—Raymond J. Bayerl
Assistant Examiner—Cao H. Nguyen
Attorney, Agent, or Firm—Kenneth L. Sherman, Esq.; Sherman & Sherman

[57] ABSTRACT

A TV GUI is provided to display a program guide that contains information on TV programming for a time period of predetermined duration. The program guide has a time scroll bar that enables a user to scroll a TV program schedule back and forward in time within the selected time period. When the user clicks on a MORE icon on the time scroll bar, the GUI switches into a "more times" mode to offer a menu of time options that represent various preselected time periods of TV programming. A time preset button may be provided on the program guide to enable users to review TV program information covering any preselected time period. A single click on the time preset button causes the GUI to switch to a program guide for the preselected time period.

22 Claims, 11 Drawing Sheets

FIG. 3

| CLUT location | Red byte | Green Byte | Blue Byte | Output Color |
|---|---|---|---|---|
| $0 | $0 | $0 | $0 | Black |
| $1 | $ff | $0 | $0 | Full Red |
| $2 | $80 | $0 | $0 | Half Red |
| $3 | $40 | $0 | $0 | Dim Red |
| $4 | $ff | $ff | $ff | White |
| $5 | $80 | $80 | $80 | Med. gray |
| $6 | $00 | $ff | $00 | Full Green |
| $7 | $00 | $00 | $ff | Full Blue |
| $8 | $00 | $ff | $ff | Cyan |
| etc | etc | etc | etc | etc |

TV GRAPHICAL USER INTERFACE FOR PROVIDING USER ACCESS TO PRESET TIME PERIODS OF TV PROGRAM INFORMATION

TECHNICAL FIELD

The present invention relates to television (TV) systems, and in particular, to a novel TV graphical user interface (GUI) that enables users to preset time intervals for displaying TV program information in a TV program guide.

BACKGROUND ART

The growing availability of TV broadcast and interactive services creates a need for a new type of a TV control system that would facilitate user access to options offered by TV program providers. For example, direct broadcast satellite services require users to make their selection among about a thousand TV channels with various TV programs and services. Direct television satellite broadcasting is provided via direct broadcast satellites at an uplink frequency of 17.3 to 17.9 GHz and a downlink frequency of 12.2 to 12.7 Ghz.

A digital satellite television system for direct television broadcasting includes a transmitter for transmitting television signals including video and audio components to a satellite. The satellite retransmits the received television signals to an outdoor antenna assembly that includes a dish-like antenna and a block converter. The dish-like antenna directs the received television signals to the block converter that converts the frequencies of the received television signals to respective lower frequencies.

The television signals produced by the block converter are connected via a coaxial cable to an indoor satellite receiver coupled to a TV set. The satellite receiver tunes, demodulates and otherwise processes the received television signals to provide video and audio signals with a NTSC, PAL or SECAM format suitable for processing by the TV set that produces an image on a display screen in response to the video signals, and an audible response by means of speakers in response to the audio signals.

Within the transmitter, analog video and audio signals are converted to respective digital signals compressed according to the Motion Picture Expert Group (MPEG) encoding standard. The resultant digital signals are represented by a stream of packets including error correction data. The type of packets is identified by a header code. Packets corresponding to control data may also be added to the packet stream.

In the MPEG standard, the video information may be transmitted in the form of a luminance (Y) component and two color difference (U and V) components. For example, the first color difference component may represent the difference between the red image information and the luminance image information (R-Y), and the second color difference component may represent the difference between the blue image information and the luminance image information (B-Y). In addition, the color information is compressed because the two color difference components correspond to more than one picture element. The use of color difference components and the sharing of the color difference components between picture elements reduces the transmission bandwidth.

The digital information resulting from the compression and error correction encoding is modulated on a carrier using Quaternary Phase Shift Keying (QPSK) modulation and transmitted to a satellite for retransmission.

The satellite receiver comprises a tuner for selecting the appropriate carrier signal retransmitted by the satellite and for converting the frequency of the selected carrier to an intermediate frequency (IF) signal. A QPSK demodulator demodulates the IF signal and supplies it to an error-correcting decoder to correct demodulated packets representing video and audio information. An MPEG decoder decodes and decompresses video and audio packets to form digital video and audio signals supplied to a TV set. A TV set-top box serves to deliver compressed digital video and audio signals in real time usable form to one or more TV sets.

A TV program guide presenting a list of available TV programs and services may be displayed on a TV screen to facilitate user access to TV programs and services. A conventional satellite system provides a TV program guide that contains information on 4–5 hours of TV programming beginning from the current time which may be rounded to the nearest half-hour.

However, it would be desirable to provide a TV graphical user interface (GUI) that provides user access to TV program information for any preset period of time, for example, to review program information for prime-time broadcasting.

Also, it would be desirable to minimize user efforts required to display the preselected TV program information.

DISCLOSURE OF THE INVENTION

Accordingly, one advantage of the present invention is in providing a TV GUI that allows users to view TV program information for any preset period of time.

Another advantage of the present invention is in providing a TV GUI that requires minimum user efforts to display preselected TV program information.

The above and other advantages of the invention are achieved, at least in part, by providing a television system that comprises a CPU, and a TV monitor controlled by the CPU for displaying a TV program guide that contains a first set of TV program data for a time interval of predetermined duration. For example, information on 4–8 hours of TV programming may be displayed. The TV program guide is provided with a graphical time preset object. In response to a single click on this graphical object, the TV monitor displays a second set of TV program data that may cover a time period outside the time interval of the first TV program data set. The time period for the second TV program data set may be preselected by a user. For example, the time preset object may cause information on prime-time programming to be displayed.

In accordance with one aspect of the invention, the TV program guide may include a time scroll object for scrolling the TV program data set within the predetermined time interval. Scroll icons may be provided for scrolling the TV program set back and forward in time.

In accordance with another aspect of the invention, the TV program guide further comprises a graphical channel changer having channel objects for indicating TV channels. The TV system switches to a selected TV channel when the user clicks on a channel object that represents the selected TV channel. For example, the channel objects may contain logos of TV channels. A channel object that defines a particular TV channel may be aligned with a graphical program bar of the TV program guide that contains TV program information for this TV channel.

In accordance with a further aspect of the invention, the TV program guide may comprise an additional time set object that enables the user to access various sets of TV program data outside the time interval provided by the time scroll object. When the user clicks on the additional time set object, a menu bar composed of time options is displayed on the screen. The time options define preselected time periods for TV program data. The menu bar replaces the program bars of the program guide. However, the graphical configuration of the channel changer remains unchanged.

In accordance with another aspect of the invention, a system for displaying a graphical user interface is provided. An indicator controlled by a CPU may display data relating to a time interval of predetermined duration. A graphical time preset button may be provided on the indicator. In response to a single activation of a pointing device held in the direction of the time preset button, the indicator may be switched to display data relating to a preselect time period outside the predetermined time interval.

In accordance with a method of the present invention, the following steps are carried out to display TV program information:

displaying a program guide containing TV program information for a time interval of predetermined duration,
  drawing on the program guide a graphical object indicating a time period preselected by a user, and displaying a TV program schedule for the preset time period in response to a single click on the graphical object.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

FIG. 3 illustrates contents of a color look up table.

BEST MODE FOR CARRYING OUT THE INVENTION

The best mode for practicing the invention is based on the realization of a satellite receiver in a digital satellite television system. However, it is to be understood that the present invention is applicable to any system for receiving TV signals.

Figure 1:
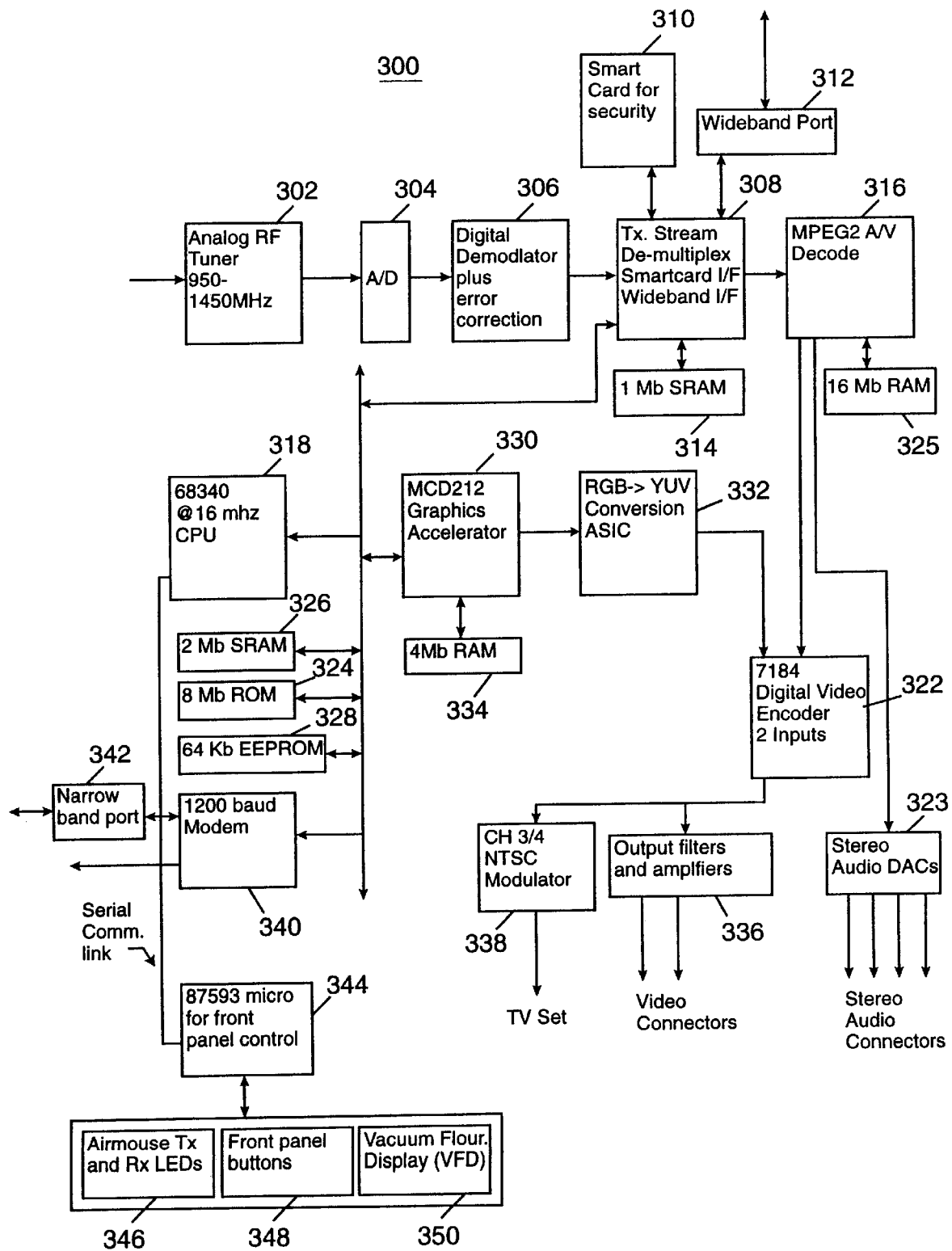
FIG. 1 is a block diagram of a satellite receiver of the present invention.

Reference is now made to FIG. 1 of the drawings wherein an indoor satellite receiver 300 includes an analog radio-frequency (RF) tuner 302 such as a satellite front end demodulator manufactured by Sharp/Comstream. The RF tuner 302 is coupled via an external UHF/VHF to an outdoor unit that receives incoming television signals from a satellite. The outdoor unit may comprise a 18" antenna made of aluminum and dual low noise block converters that convert satellite signals in a frequency range from 12.2–12.7 GHz received by the antenna into the 950–1450 Mhz frequency range signals.

The RF tuner 302 equipped with a local oscillator and mixer selects the appropriate carrier signal corresponding to a selected satellite TV channel from the 950–1450 Mhz signals received from the outdoor unit. The frequency of the selected carrier is converted to an intermediate frequency (IF) signal fed to an analog-digital converter 304 that produces a digital IF signal.

A digital demodulator 306 performs QPSK demodulation of the digital IF signal and carries out multiple error correction algorithms required to decode error correction data contained in the received signal. For example, Viterbi and Reed-Solomon error correction algorithms may be employed. A single ASIC manufactured by Comstream may be used as the digital demodulator 306.

The decoded digital signal is fed to a transport chip 308 responsible for demultiplexing video, audio and data signals. The transport unit 308 is also connected to a card 310 for providing conditional access to the satellite receiver 300. The card 310, such as a Smart Card manufactured by the News Data Corporation, controls access to paid channels and services using the Data Encryption Standard (DES).

Wideband data are fed to the transport unit 308 via a wideband port 312 that provides compatibility with 16:9 wide NTSC format. The wideband port is also controlled by the conditional access system. A buffer 314 is used to support the transport chip operations. A 128K×8 static random-access memory (SRAM) with access speed of 70 ns may be used as the buffer 314.

The transport chip 308 routes the video and audio signals to an MPEG decoder 316, while data is made available to a CPU 318. The MPEG decoder 316 provides decompression of the video and audio signals in accordance with the MPEG standard. For example, a single-chip STi3520 MPEG decoder may be used. By way of example, reference is made to U.S. Pat. No. 5,198,901 to Lynch of Mar. 30, 1993; to U.S. Pat. No. 5,293,229 to Iu of Mar. 8, 1994; to U.S. Pat. No. 5,311,310 to Jozawa et al. of May 10, 1994; to U.S. Pat. No. 5,361,105 to Iu of Nov. 1, 1994; to U.S. Pat. No. 5,386,234 to Veltman et al. of Jan. 31, 1995; and to U.S. Pat. No. 5,400,076 to Iwamura of Mar. 21, 1995. Those disclosures and citations referenced therein may be consulted for an understanding of the specific details of conventional MPEG decompression arrangements.

The MPEG decoder 316 of the preferred embodiment is supported by a synchronous RAM 320 formed by four 256K×16 DRAMs with access speed of 70 ns capable of holding 3 full frames of MPEG video and audio data, and control information.

Decompressed video data in YUV format is fed to a digital video encoder 322. The decompressed audio data is supplied to the video encoder 322 and to a stereo audio digital-to-analog converter (DAC) 324 for converting digital audio signals into analog form. A single-chip AK4319 DAC, manufactured by Asahi Kasei, may be used as the DAC 324.

Operations of the satellite receiver 300 are supported by the CPU 318 such as a Motorola 68340 CPU chip running at 16 MHz. An external watch crystal is used to derive the 16 MHz internal clock. The CPU 318 may have a 16-bit external data bus and a 32-bit data bus for internal operations. The CPU 318 may run the PSOS+ operating system developed by Integrated Systems Inc.

The CPU 318 is supported by a ROM 324, a SRAM 326 and an EEPROM 328. The ROM 324 that holds the PSOS+ operating system, menus, fonts, and other fixed data may be formed by two 4Mbit masked ROM chips organized as 512K×8 with access speed of 95 ns.

The SRAM 326 formed, for example, by two 1Mbit SRAM chips organized as 128K×8 with access speed of 70 ns, may be used for storing all active data such as system stacks, variables, menu data, etc. The ROM 324 and SRAM 326 may operate at a zero wait state to provide maximum performance.

The EEPROM 328, for example, a single 8K×8 EEPROM chip with access speed of 150 ns, may store non-volatile data such as user preferences.

To enhance the graphics presentation capabilities of the satellite receiver 300, a graphics accelerator 330, such as a MCD212 graphics accelerator manufactured by Motorola, is used as a co-processor. The graphics accelerator 330 allows the receiver 300 to increase the rate of screen updates and to provide up to 256 colors in a graphics image. Also, the accelerator provides graphical effects such as wipes, dissolves, fades, etc. during transitions of menus on a TV screen, and supports operations of a remote pointing device such as an Airmouse®. This type of remote pointing device is manufactured by Seletech and Airmouse Remote Controls. The output of the graphics accelerator 330 produced in RGB format is fed to a converting circuit 332 for conversion into YUV format.

The graphics accelerator 330 may be supported by a synchronous 4Mbit RAM 334 provided, for example, on a single 256K×16 DRAM chip with access speed of 70 ns. The RAM 334 used for storing graphics data is capable of storing two graphics planes with 720×480 pixel resolution. The graphics accelerator 330 allows two graphics planes to be combined to produce various graphical effects.

The graphics data from the conversion circuit 332, and decompressed video and audio data from the MPEG decoder 316, are supplied to separate inputs of the digital video encoder 322 such as a single-chip Phillips 7184 encoder. The video encoder 322 is responsible for encoding digital video, audio and graphics data to produce a combined composite signal in NTSC format. For example, U.S. Pat. No. 5,489,947 to Cooper of Feb. 6, 1996, incorporated herewith by reference, discloses an on-screen display (OSD) arrangement that allows the graphics data to be displayed on a TV set screen together with the image represented by the received video signals, or in place of this image. A single control bit may be used by the video encoder 322 to switch its output from graphics data to video and back.

The video encoder 322 also produces baseband video and audio signals. The baseband video signals are buffered by a pair of video operational amplifiers 336 coupled to video connectors. The baseband audio signals are fed to the stereo audio DAC 324 for converting to analog format and supplying to audio connectors. The video and audio connectors may be coupled to such external devices as stereo receivers, TVs or VCRs.

The combined composite signal from the video encoder 322 may be fed to a NTSC modulator 338 that modulates the composite signal to either channel 3 or 4 of a TV set coupled to the modulator 338. The modulator 338 also allows the combined composite signal to bypass a cable/antenna input of the TV set. Operations carried out to display video and graphical images on the TV set screen will be described in more detail later.

The TV set coupled to the satellite receiver 300 may display graphics data representing a graphical user interface (GUI) that allows a user to control operations of the satellite receiver 300, and provides user access to services and options offered by the digital satellite TV system. For example, graphics on the TV set screen may represent a graphical channel changer that enables a user to select TV channels. Another example of a graphical presentation on the TV screen is an electronic program guide that contains names of TV programs arranged in a 2-dimensional array, in which TV channels are listed vertically, and the time of broadcasting is listed in the horizontal direction. Various aspects of the GUI including the graphical channel changer and the electronic program guide are discussed in more detail later.

A modem 340, such as a single-chip SSI 1200-baud modem, is provided to support communications via a narrowband port 342 used for low bandwidth signal transmission, or via a telephone jack connected to a telephone line. For example, the modem 340 may support remote billing and interactive services.

A microcontroller 344 such as a Phillips 87593 microcontroller provides control of receiver functions relating to control, interface and display devices arranged at the front panel of the satellite receiver 300. Among such devices are a pointing device interface 346, front panel controls 348, and a vacuum fluorescent display (VFD) 350.

The pointing device interface 346 enables a remote optical pointing device such as an Airmouse® to provide a wireless control of the satellite receiver 300. By way of example, reference is made to U.S. Pat. No. 5,045,843 to Hansen of Sep. 3, 1991, and U.S. Pat. No. 5,359,348 to Pilcher et al. of Oct. 25, 1994 for descriptions of Airmouse® arrangements and operation. For example, the pointing device interface 346 may comprise an infrared (IR) transmitter and receiver that provide infrared communications with a pointing device located up to 7 meters away from the receiver 300 at an angle of up to 45 degrees. This type of remote pointing device has been used principally for moving the cursor of a personal computer.

The Airmouse® type pointing device in accordance with the invention points directly at a TV set screen to provide direct interactions between the user hand that holds the pointing device, and the TV screen. The pointing device may comprise a cursor control circuit that moves a cursor on the TV screen in response to the position of the pointing device with respect to, for example, the IR transmitter at the front panel of the receiver. The pointing device interface 346 supports the GUI by providing and controlling the RF tuner 302 of the satellite receiver to respond to random, instant user access to any point on the TV screen. Selections are made by clicking one of the buttons on the pointing device. For example, at any time when there are no graphics on the screen, a click brings up graphical objects used in a channel changer mode. Interactions between the GUI and remote pointing device are disclosed in more detail in our copending application SN entitled "TELEVISION GRAPHICAL USER INTERFACE EMPLOYING REMOTE RANDOM ACCESS POINTING DEVICE," filed concurrently herewith and incorporated by reference.

In addition to the optical pointing device, a remote hand held control unit of the satellite receiver 300 may also include several dedicated buttons to provide, for example, switching power ON and OFF, channel and volume control, selection between regular TV broadcasting and satellite broadcasting, etc.

The front panel control 348 provides control of the GUI in the event that the remote pointing device is missing or non-operable. The controls 348 may include a TV/Satellite receiver key for switching between regular TV broadcasting and satellite broadcasting. Set-up, menu, clear, select or "click" keys may be provided to control modes of operation. Cursor keys may be arranged to move the cursor on the TV screen in various directions.

The VFD 350 is provided to show current TV channel number and time. Also, the VFD 350 may indicate current incoming signal strength and other operational information.

Figure 2:
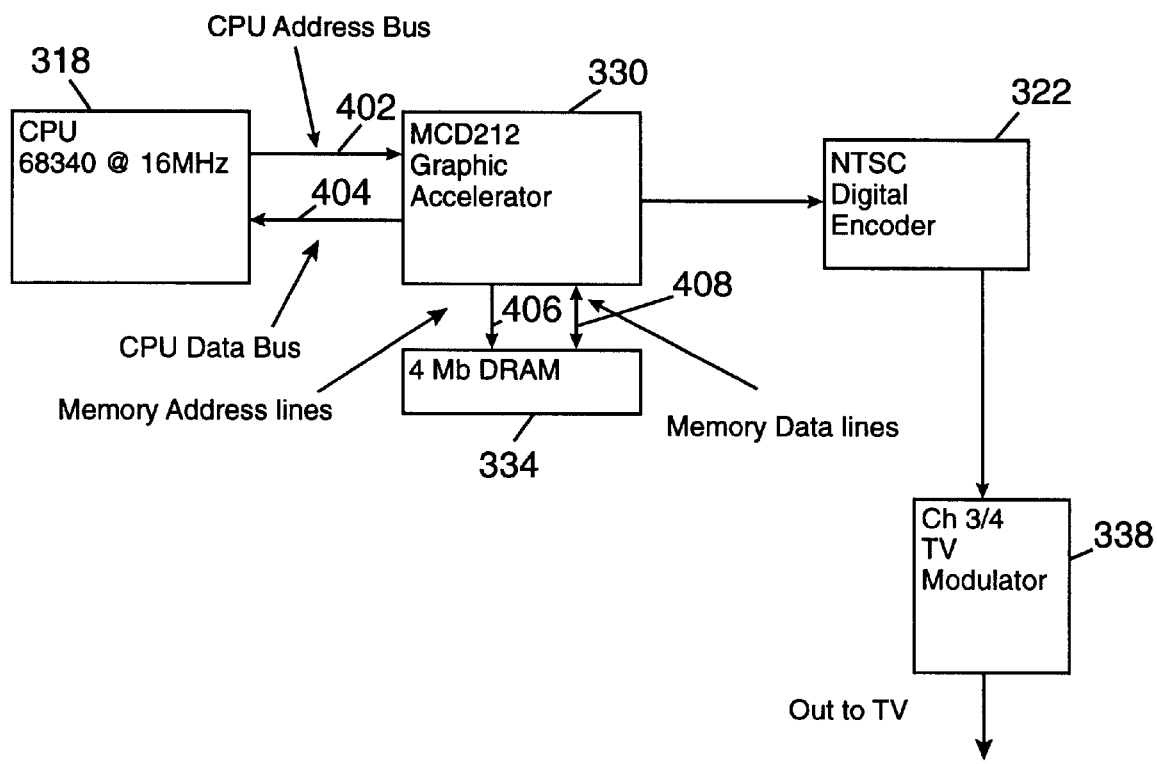
FIG. 2 is a block diagram illustrating a graphical object drawing procedure.

Reference is now made to FIG. 2 that illustrates drawing color graphic objects on a TV screen accordingto the present invention. As discussed above, the CPU 318 interacts with the graphics accelerator 330 used as a co-processor to enhance the graphics capability of the satellite receiver 300. The CPU 318 may be coupled to the graphics accelerator 330 via an external 24-bit address bus 402 and a 16-bit data bus 404. The 24-bit address bus 402 enables the CPU 318 to address up to 16Mbytes of a graphics memory. This storage capacity corresponds to an address space from 000000 to ffffff in hexadecimal notation. Various graphics memory arrangements may be organized in this address space, as long as each memory location is uniquely addressable. For example, the capacity of the graphics memory 334 may be equal to 4Mbit or 512Kbytes. Assuming that the graphics memory address space corresponds to the middle part of the system memory map, the $800000 hex address may be selected as the lowest graphics memory location, and the $87ffff hex address may be designated as the top graphics memory address. The graphics memory 334 may be coupled to the graphics accelerator 330 via memory address lines 406 and memory data lines 408.

The graphics accelerator 330 enables a TV set to display up to 16 million different colors. However, only 256 different colors can be displayed on any one screen at any given time. As a result, each unique pixel displayable on a TV screen can be represented by a single 8-bit value. Thus, each pixel stored in the 512Kbyte graphics memory 334 is represented by a single 8-bit value or byte.

Each graphics plane stored in the graphics memory 334 is provided by a rectangular array of 720×480 pixels representing a picture on the TV screen. For example, the pixels may be stored in the graphics memory 334 from top left to bottom right in row order. Thus, the top left hand pixel of the screen resides at the $800000 hex graphics memory location. The second pixel on the top line 1 is stored at $800001 hex, etc. The last pixel of the top line 1 is held at $8002D0 hex. The first pixel of the next line 2 is at the $8002D1 hex graphics memory location, etc. The bottom right hand corner of the screen corresponds to the $8545ff location of the graphics memory 334. Thus, the graphics memory arrangement corresponds to a rectangular X,Y-coordinate system on the TV screen, where 720 pixels in each line of the array are arranged in the horizontal direction X, and 480 pixels in each row of the array are arranged in the vertical direction Y.

The graphics accelerator 330 contains a color look up table (CLUT) that converts 256 elements representing 8-bit pixel values stored in the graphics memory 334 into 24-bit values composed of red (R), green (G), and blue (B) bytes corresponding to R, G, and B components of a picture in RGB format. The CLUT may be programmed by the CPU 318 to reproduce any color possible in a 24-bit color space.

FIG. 3 illustrates some typical colors reproducible by the CLUT. For example, black color composed of red, green and blue bytes represented by $0 hex may correspond to the $0 hex location of the CLUT. White color composed of the $ff hex red, green and blue bytes may correspond to the $4 hex CLUT location, etc.

When the CLUT is programmed, the CPU 318 accesses the graphics memory 334 to write data values representing graphics. The graphics accelerator 330 scans the graphics memory 334 at a rate of 13.5 MHz to read the graphics data. Each 8-bit pixel value is transferred to the CLUT that converts it into a 24-bit color value in RGB format. As discussed above, the converter 332 converts the RGB color value into YUV format, and passes a 24-bit digital YUV value to the digital encoder 322 that converts it into analog NTSC luminance and chrominance signals, for example, at a 13.5 MHz rate. The NTSC encoding procedure carried out by the encoder 322 is well known to those skilled in the art. The analog luminance and chrominance signals via the TV modulator 338 are supplied to the TV set.

Figure 4:
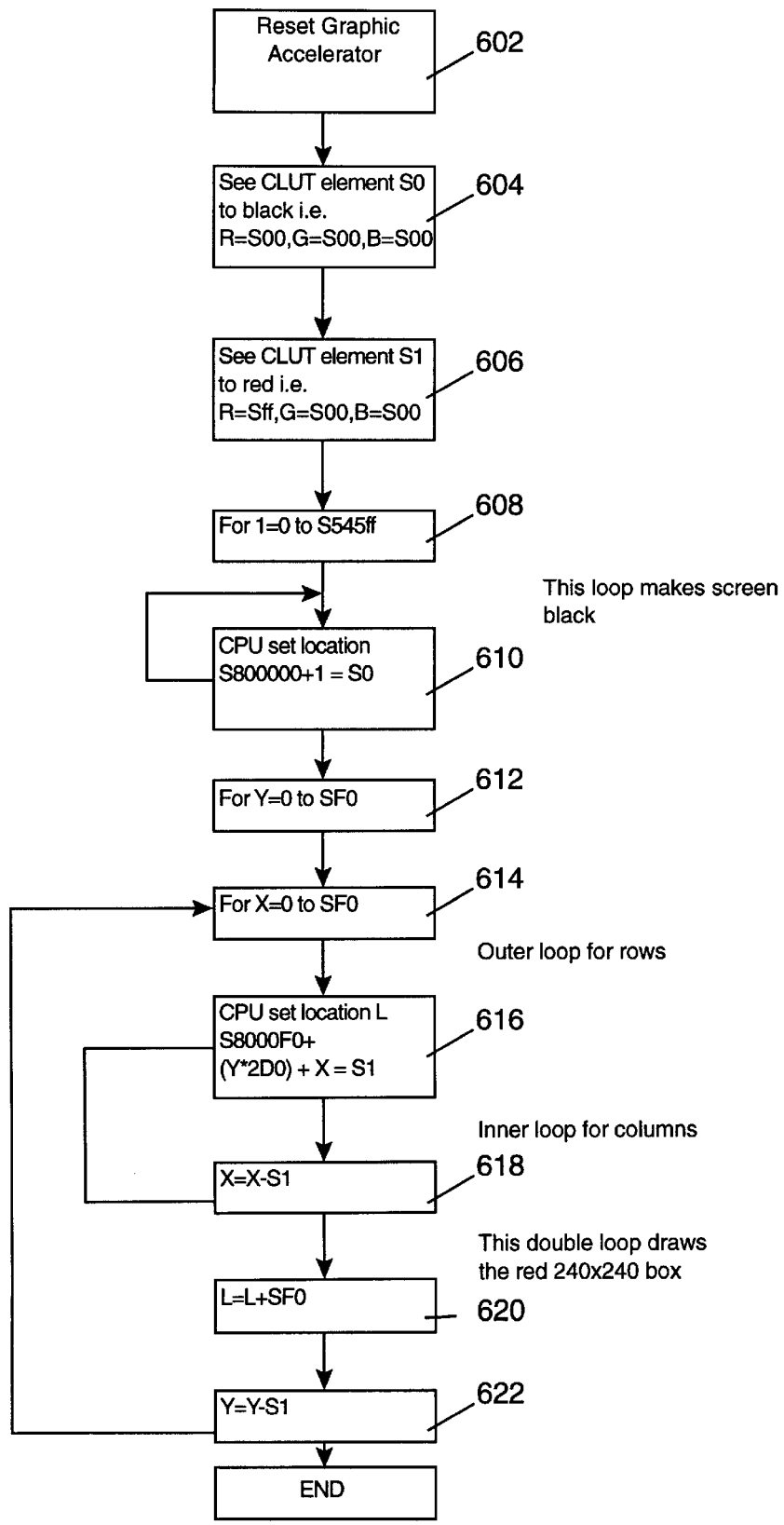
FIG. 4 is a flow chart illustrating an example of interactions between a CPU and graphics accelerator.

FIG. 4 shows a flow chart that illustrates an example of interactions between the CPU 318 and graphics accelerator 330 to draw a 240×240 pixel red square in the middle of a TV screen with a black background. In step 602, the CPU 318 resets the graphic accelerator 330. In step 604, the CPU 318 programs the CLUT in the graphics accelerator 330 so as to set CLUT location $0 hex to reproduce black color, i.e. red, green and blue bytes in this location are set to $0 hex. In step 606, the CPU 318 sets CLUT location $1 hex to reproduce red color, i.e. a red byte in this location is set to $ff hex, and green and blue bytes are set to $0 hex.

In steps 608 and 610, the CPU 318 carries out a loop to make the TV screen black. Locations $800000+I of the graphics memory 334 are set to $0 hex, for I that varies from $0 hex to $545ff hex.

In steps 612–622, the CPU 318 performs a double loop to draw the red 240×240 pixel box on the screen. The double loop comprises an outer loop carried out to set pixels in rows (Y-direction on the screen) of the graphics memory 334 to $1 hex to reproduce them in red color, and an inner loop to set pixels in lines (X-direction) of the graphics memory 334 to $1 hex to reproduce them in red color.

Figure 5:
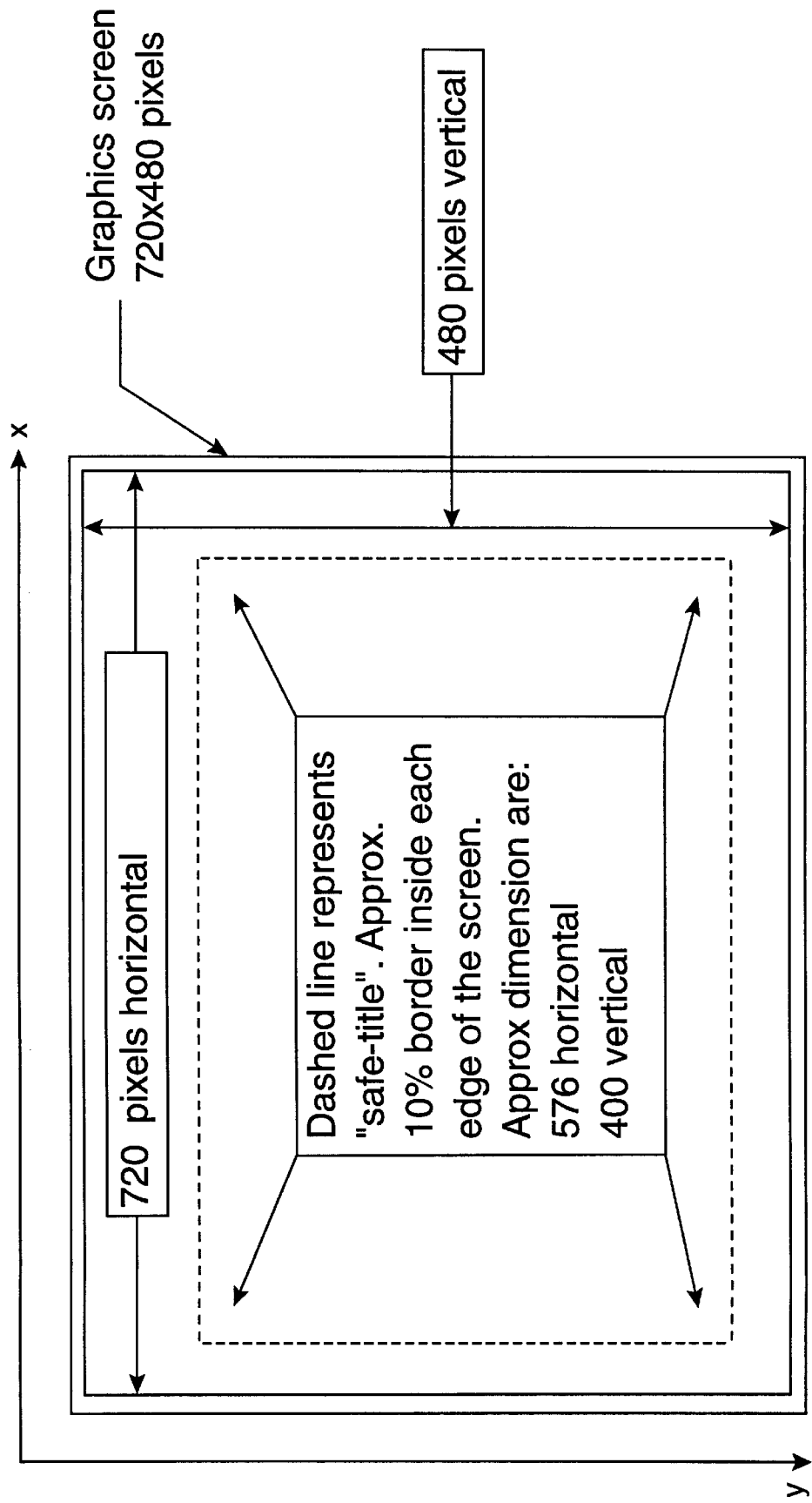
FIG. 5 is a diagram illustrating arrangement of pixels on a TV screen.

Graphical objects displayed on the TV screen are represented by a 2-dimensional array of pixels. For example, as shown in FIG. 5, the TV screen may be represented by a 720×480 array of pixels corresponding to a graphics plane stored in the graphics memory 334. 720 pixels may be arranged on the screen in the horizontal direction X, whereas 480 pixels may be arranged in the vertical direction Y. To perform graphics drawing operations, the CPU 318 may use an X,Y-coordinate system shown in FIG. 5, wherein coordinates X=0, Y=0 represent the top left hand corner of the TV screen, and coordinates X=720, Y=480 represent the bottom right hand corner of the screen.

It should be noted that due to "overscan" conditions, a television receiver may produce a raster on its screen so that pixels in the horizontal and vertical directions may not be entirely in the view of the user. Therefore, TV broadcast systems prevent images from being displayed outside of a "safe title" area located within approximately a 10% border all around the edge of the screen. As shown in FIG. 5, the safe title area contains approximately 576 pixels in the horizontal direction, and 400 pixels in the vertical direction. With such a scheme, the top left hand corner of the safe title area is located at position X=72, Y=40. The bottom right hand corner of the safe title area has coordinates X=648, Y=440. On the discussed below diagrams that illustrate the functional modes of the GUI, an outer solid-lined box represents the edge of the TV screen, and a dash line shows the border of the safe title area. The graphical objects displayed in various GUI modes are drawn in accordance with the graphical object drawing procedure discussed above in connection with FIGS. 2–4.

Figure 6:
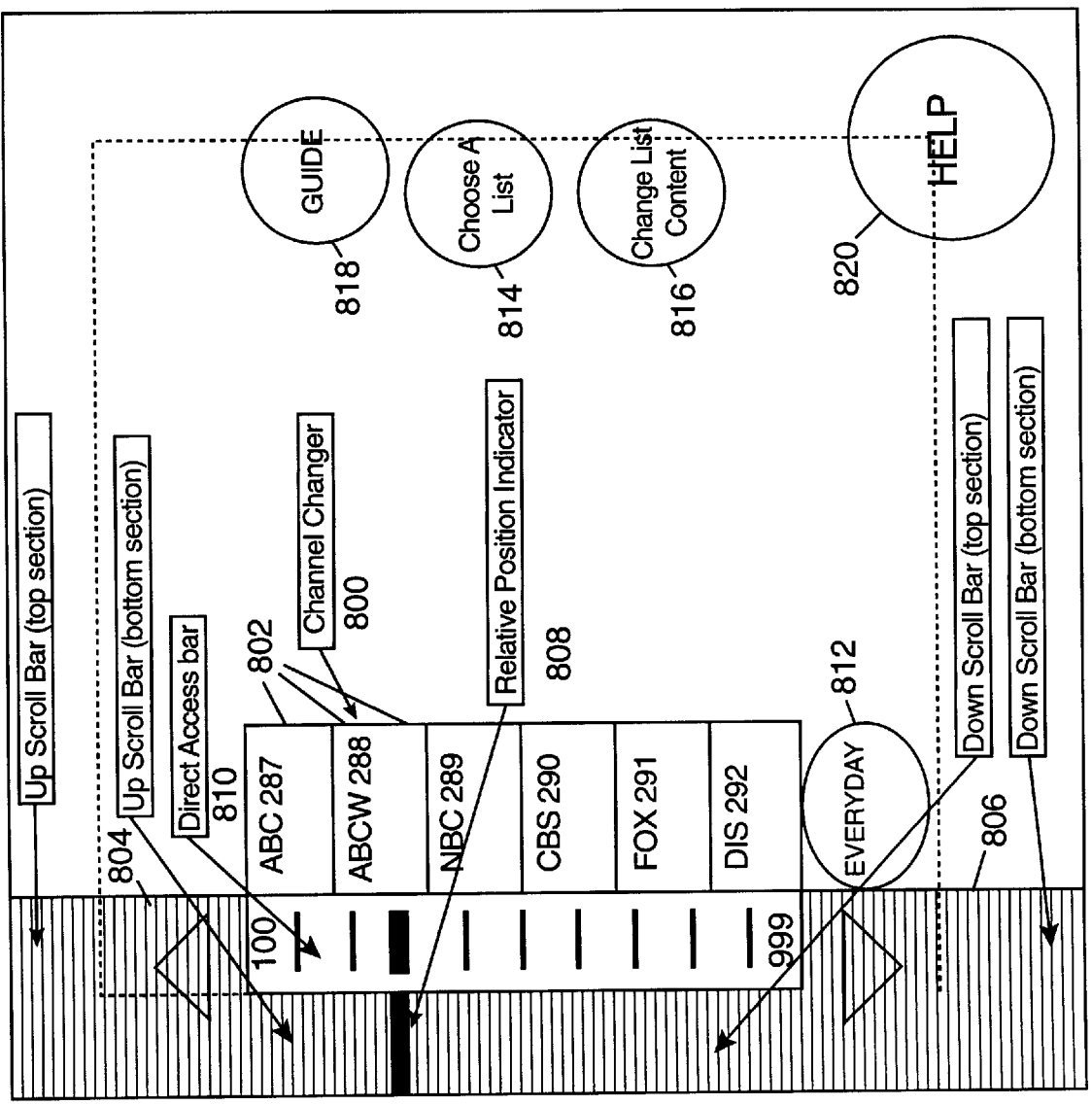
FIG. 6 is a diagram illustrating a TV GUI displayed on the screen in a channel changer mode.

Referring to FIG. 6, when the TV GUI of the present invention is placed in a channel changer mode that enables users to select TV channels, a TV set coupled to the satellite receiver 300 displays a graphical channel changer 800 having a vertical channel bar that includes graphical channel boxes 802 representing TV channels available in the satellite receiver 300. For example, each box 802 may contain the channel number and logo of a TV channel. In a digital satellite TV system, the channel bar may represent about 1,000 TV channels. A restricted number of the boxes 802 may be displayed on the TV screen at any given time. For example, FIG. 6 shows that six boxes 802 representing channels 287–292 are simultaneously displayed. The vertical channel bar may be represented by 120×300 pixels. For example, its top left corner may have coordinates X=122, Y=90, and its bottom right corner may be arranged at X=242, Y=390.

Up and down scroll bars 804 and 806 may be arranged near the channel bar to allow a user to move up and down through the entire list of TV channels. For example, the scroll bars 804 and 806 shown in FIG. 6 represent channels 100 through 999. A single click of the pointing device button causes the channel changer 800 to move up or down by one channel with respect to the TV channels currently represented in the channel boxes 802. For example, when the user clicks the pointing device held in the direction of the up scroll bar 804, the boxes 802 will shift from channels 287–292 to channels 286–291. If the pointing device points at the down scroll bar 806, a single click will cause the boxes 802 to move from channels 287–292 to channels 288–293. Holding down the pointing device button may cause the list of TV channels to scroll continuously. A relative position indicator 808 shows the position of the TV channels currently displayed in the channel boxes with respect to other TV channels. Operations of the scroll bars are disclosed in more detail in our copending application SN____, entitled "TELEVISION GRAPHICAL USER INTERFACE HAVING VARIABLE CHANNEL CHANGER ICONS," filed concurrently herewith and incorporated by reference.

It may be difficult to find a required channel among 1,000 channels provided by satellite TV, when the user does not know the number of the required channel. A direct access channel bar 810 presented next to the channel bar has a graduated scale representing available TV channels. The numbers of the first and last channels are respectively placed on the top and bottom of the scale. For example, the channel bar 810 has numbers 100 and 999 on its top and bottom indicating that TV channels 100 through 999 are represented. When a user points the pointing device at a selected region of the channel bar 810, the channel boxes 802 display numbers and logos of TV channels represented by that selected region. Operations of the direct access channel bar 810 are disclosed in more detail in our copending application SN____, entitled "TELEVISION GRAPHICAL USER INTERFACE HAVING CHANNEL CONTROL BARS," filed concurrently herewith and incorporated by reference.

The graphical channel changer 800 allows the user to include any combination of TV channels into a channel list to be displayed. An oval object 812 may be arranged below the channel bar to indicate the name of the currently selected channel list. Graphical buttons Choose a List and Change List Content 814 and 816, respectively, allow the user to select a channel list and to change the contents of the list.

When the user directs the remote pointing device at a graphical button GUIDE 818, the graphical channel changer 800 is transformed into an electronic program guide, as discussed in more detail later. A graphical button HELP 820 causes the TV GUI to switch into a help mode to assist the user in navigating through graphical options. Each component of the graphical channel changer may be displayed using the above-discussed procedure of drawing color graphic objects on a TV screen.

To switch the TV set to a required TV channel, the user directs the pointing device at the graphical channel box 802 that contains the number and logo of the required channel. The movement of the pointing device held in the user3 s hand causes the cursor to move to the required graphical channel box 802. The coordinates of the pointing device may be supplied to the microcontroller 344 on a periodic basis, for example, 60 times a second. The CPU 318 generates X, Y coordinates corresponding to a path for moving the cursor in alignment with pointing device movement. Cursor movement is achieved by multiple erasures and redraws of the cursor image performed on the path to the selected position. When the required cursor position is reached, the user may press a select button on the pointing device to tune to the required channel. In response to the user command, the CPU 318 sends a tune command to the RF tuner 302 to tune the satellite receiver 300 to the required TV channel.

When the user moves the cursor over any of the graphical buttons, they change their color to show to the user that the corresponding button is active and if clicked on will cause the system to perform the required task. When the cursor passes over any channel box 802, that box will be highlighted.

Figure 7:
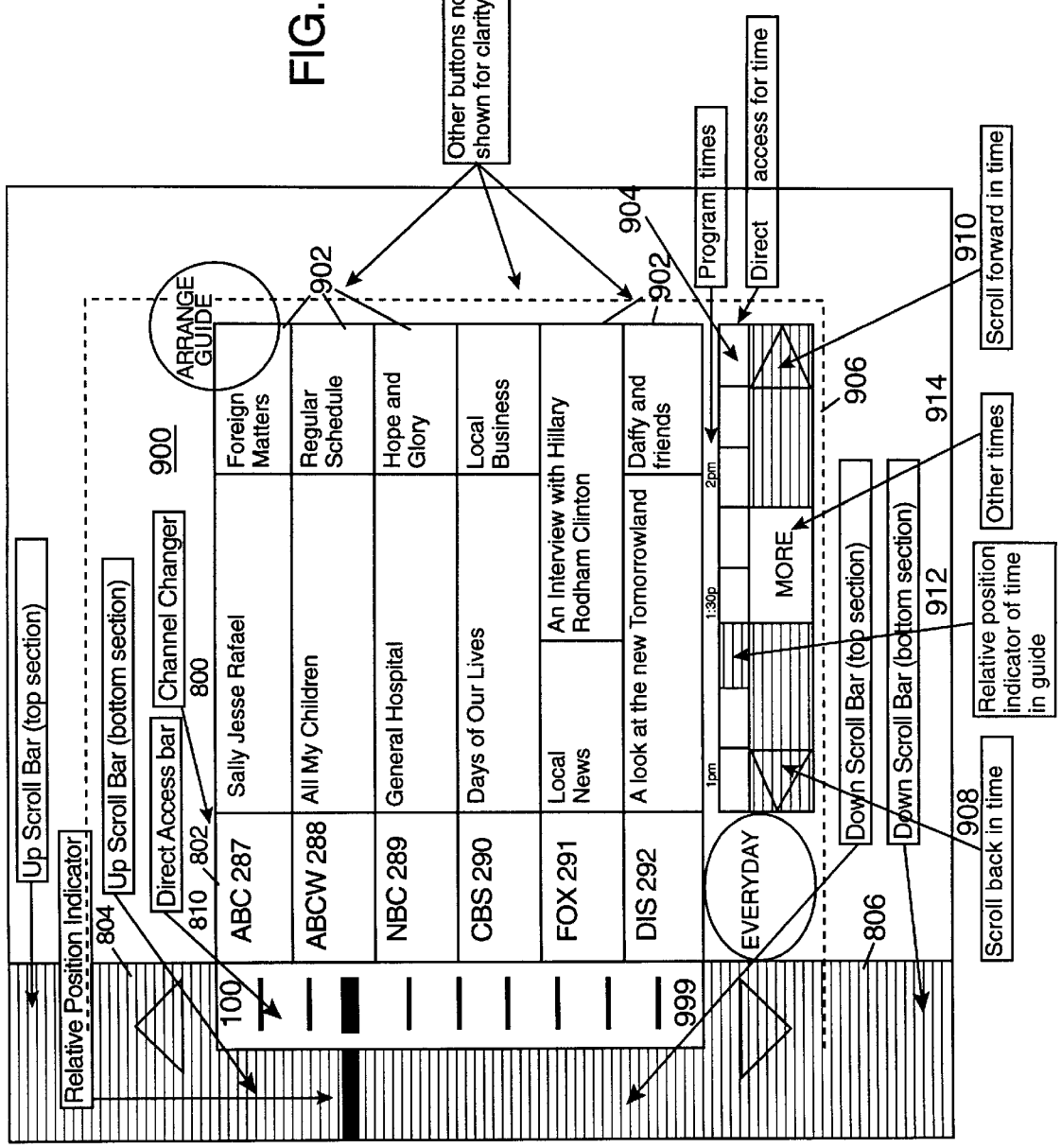
FIG. 7 is a diagram showing the TV GUI in a program guide mode.

Reference is now made to FIG. 7 that illustrates a program guide mode that enables users to view TV programming information for various TV channels. To move from the channel changer mode to the program guide mode, the user may click the pointing device held in the direction of the GUIDE button 818 on the screen. Switching from one mode into another is disclosed in more detail in our copending application SN____, entitled "TELEVISION GRAPHICAL USER INTERFACE THAT COMBINES ELECTRONIC PROGRAM GUIDE WITH GRAPHICAL CHANNEL CHANGER," filed concurrently herewith and incorporated by reference.

In the program guide mode, the TV GUI of the present invention displays an electronic program guide 900 formed out of the graphical channel changer 800 when the TV GUI switches from the channel changer mode into the program guide mode. No redrawing of the vertical channel bar is performed. Further, the TV GUI may maintain the up and down channel scroll bars 804 and 806, and the direct access channel bar 810.

In addition to the elements displayed in the channel changer mode, the program guide 900 comprises horizontal program bars 902 that indicate TV programs carried by TV channels during a predetermined time period. For example, ninety minutes of programming may be shown. TV program information displayed in the program bars 902 may be stored in an internal program guide database arranged in the EEPROM 328 or SRAM 326. The internal database may contain information on scheduled TV programs for all TV channels. For example, TV programming information for next 48 hours or more may be stored in the internal database.

The program bars 902 are divided into time slots of predetermined duration. For instance, half-hour time slots may be used. The CPU 318 calculates TV program boundaries for the time slots of the program bars to display a TV program scheduled for a given time slot.

Each horizontal program bar 902 is aligned with the channel box 802 representing the TV channel that carries the TV programs indicated in that program bar 902. The two-dimensional program/time grid appears instantaneously aligned with the graphics for the channel changer. This allows the user to quickly and seamlessly go from the channel selector mode to the program guide mode, and thereafter, select a TV channel that carries a desired TV program by directing the remote pointing device at the channel box 802 for the selected TV channel.

Below the horizontal bars 902 are time legends that indicate the time of the TV programs represented by the horizontal bars 902. For example, the electronic program guide 900 shown in FIG. 7 contains TV programming from 1 p.m. to 2.30 p.m.

A direct access time bar 904 similar to the direct access channel bar 810 may be arranged below the time legends to enable the user to access a TV program schedule for a selected region of the time bar 904 by directing the pointing device at the selected region.

A horizontal time scroll bar 906 positioned below the direct access time bar 904 allows the user to look at TV program schedule before and after the time indicated by the time legends. The user may click on icons 908 and 910 to scroll the TV program schedule back and forward in time. For example, the time scroll bar 906 may enable the user to view about 4 hours of programming. A relative position indicator 912 shows the current time interval within the time period covered by the time scroll bar 906.

If the user wants to view TV program information outside the time period provided by the time scroll bar 906, the remote pointing device may be clicked on an icon MORE 914 positioned on the time scroll bar 906. In response to clicking on this icon, the TV GUI switches into a "more times" mode.

Figure 8:
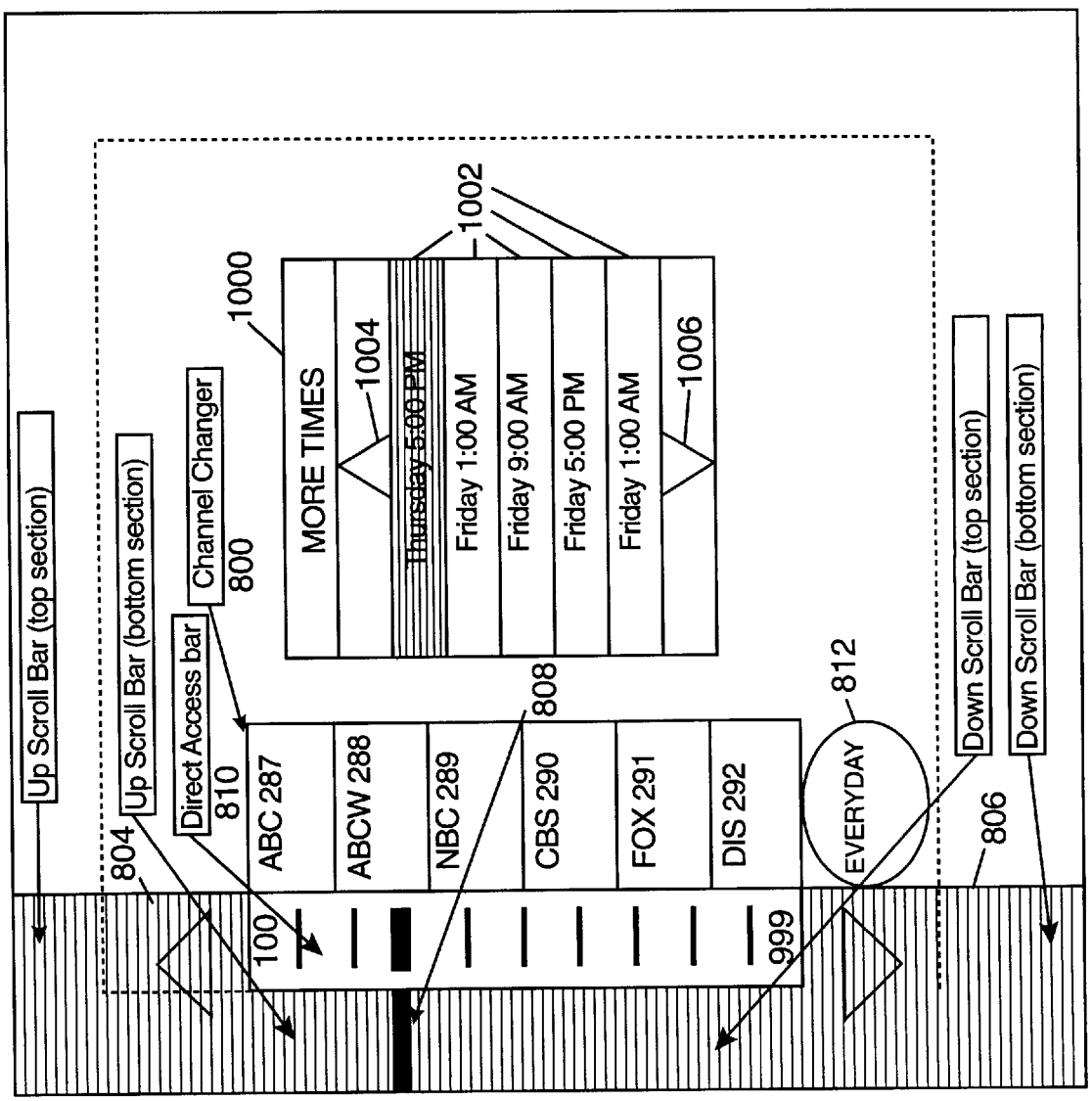
FIG. 8 is a diagram illustrating the TV GUI in a "more times" mode.

As shown in FIG. 8, in the more times mode, the GUI maintains the channel changer 800 and the icons 804–812 unchanged compared to the channel changer mode. Thus, the user remains in a familiar environment and does not need to adapt to a new format on the screen.

The program/time grid of the program guide 900 is replaced with a menu bar MORE TIMES 1000 composed of time options 1002 that define preselected time periods of future programming. Only several of the available time options 1002 may be displayed in the MORE TIMES menu bar 1000. Icons 1004 and 1006 allow the user to scroll the MORE TIMES menu bar 1000 in two directions to display additional time options 1002.

Figure 9:
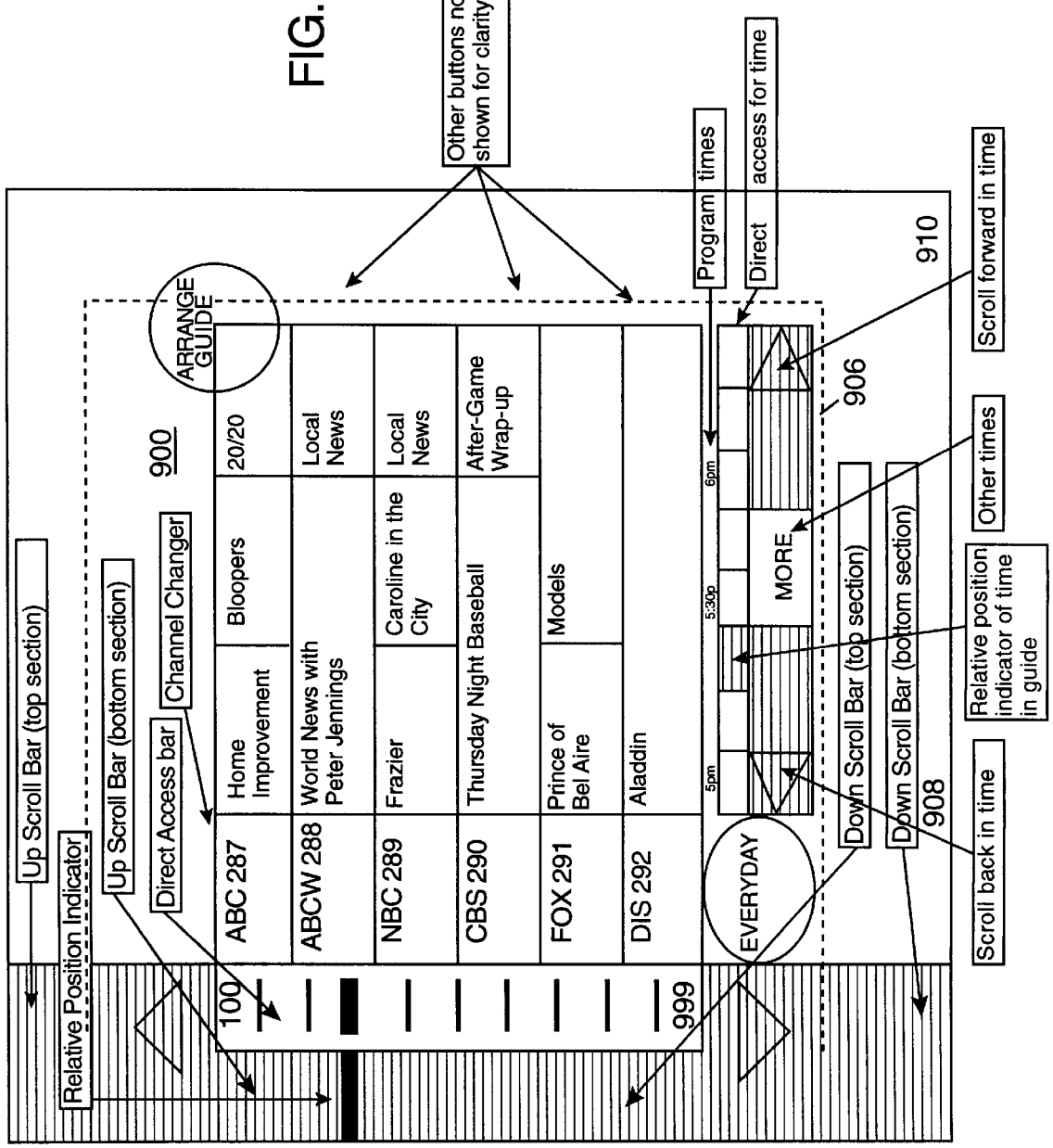
FIG. 9 is a diagram illustrating selection made in the "more times" mode.

For example, the user may click on the Thursday 5:00 PM option 1002 to view programming starting next Thursday at 5 P.M. In response, the CPU 318 checks the internal program guide database to determine whether the program information for the required time period is available. If so, the GUI switches to the program guide that contains TV program information for a predetermined time interval starting on Thursday at 5 P.M. (FIG. 9). For example, the 8 hour time interval may be preset. The CPU 318 retrieves the required program information from the internal program guide database to display on the screen. If no program information for the required time period is available in the internal database, the CPU 318 requests the required program information from a central database of a digital satellite system, and writes the received data into the internal program guide database for displaying on the screen. A system for receiving program information from the central database is well known to one skilled in the satellite TV art.

Figure 10:
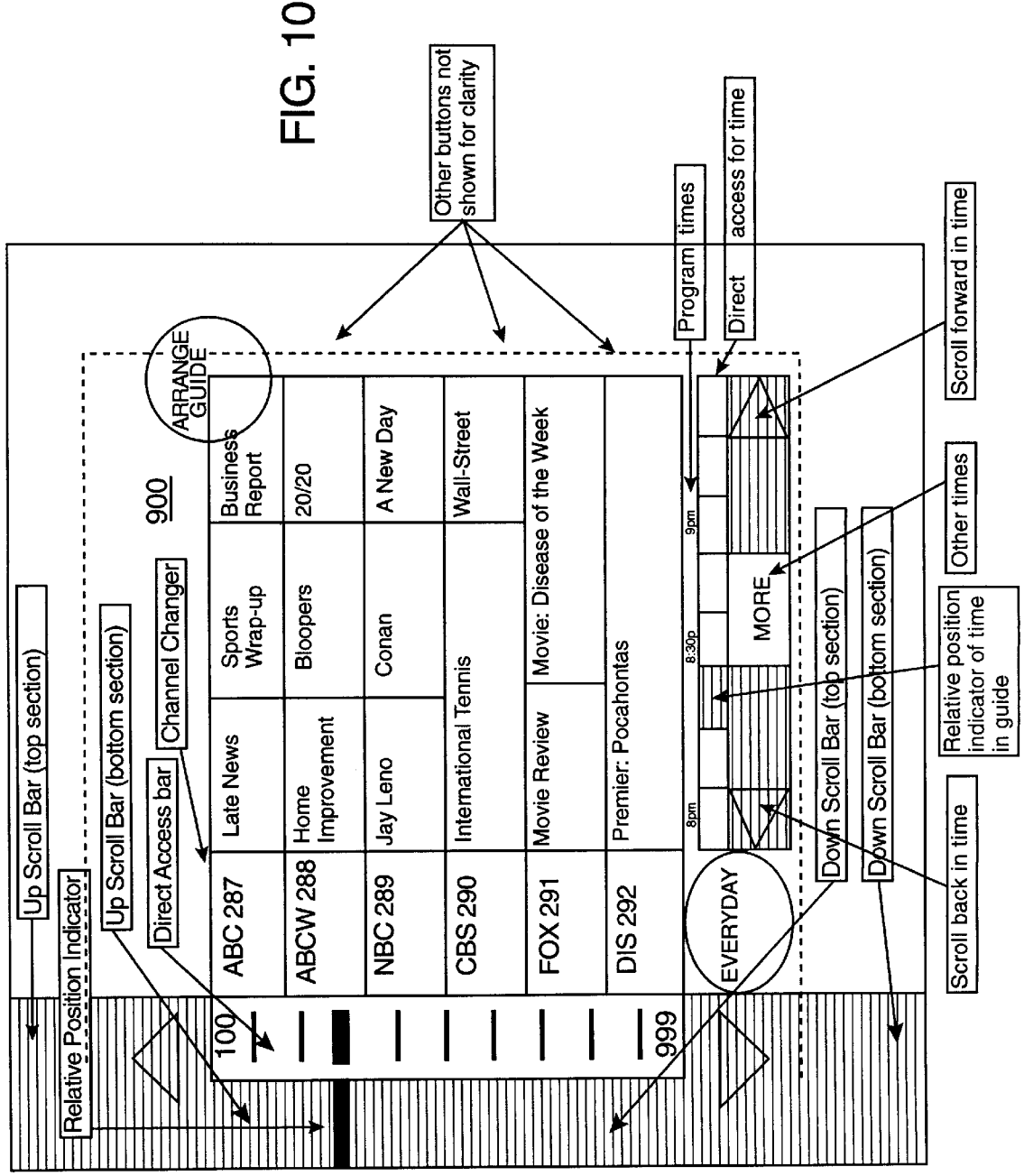
FIG. 10 is a diagram that illustrates scrolling the program guide to 8 P.M.

As shown in FIG. 9, the program guide 900 displayed on the screen shows TV program information for 3 half-hour time slots starting from 5 P.M. Program information for succeeding time slots may be displayed by clicking on the scroll forward icon 910 of the time scroll bar 906. For example, if the user wants to review programming for time period starting at 8 P.M., the remote pointing device may be clicked 6 times, to scroll the program guide forward in time by 6 half-hour time slots. At this point, the screen will display the program guide 900 illustrated in FIG. 10, wherein TV program information from 8 P.M. until 9.30 P.M. is indicated.

Figure 11:
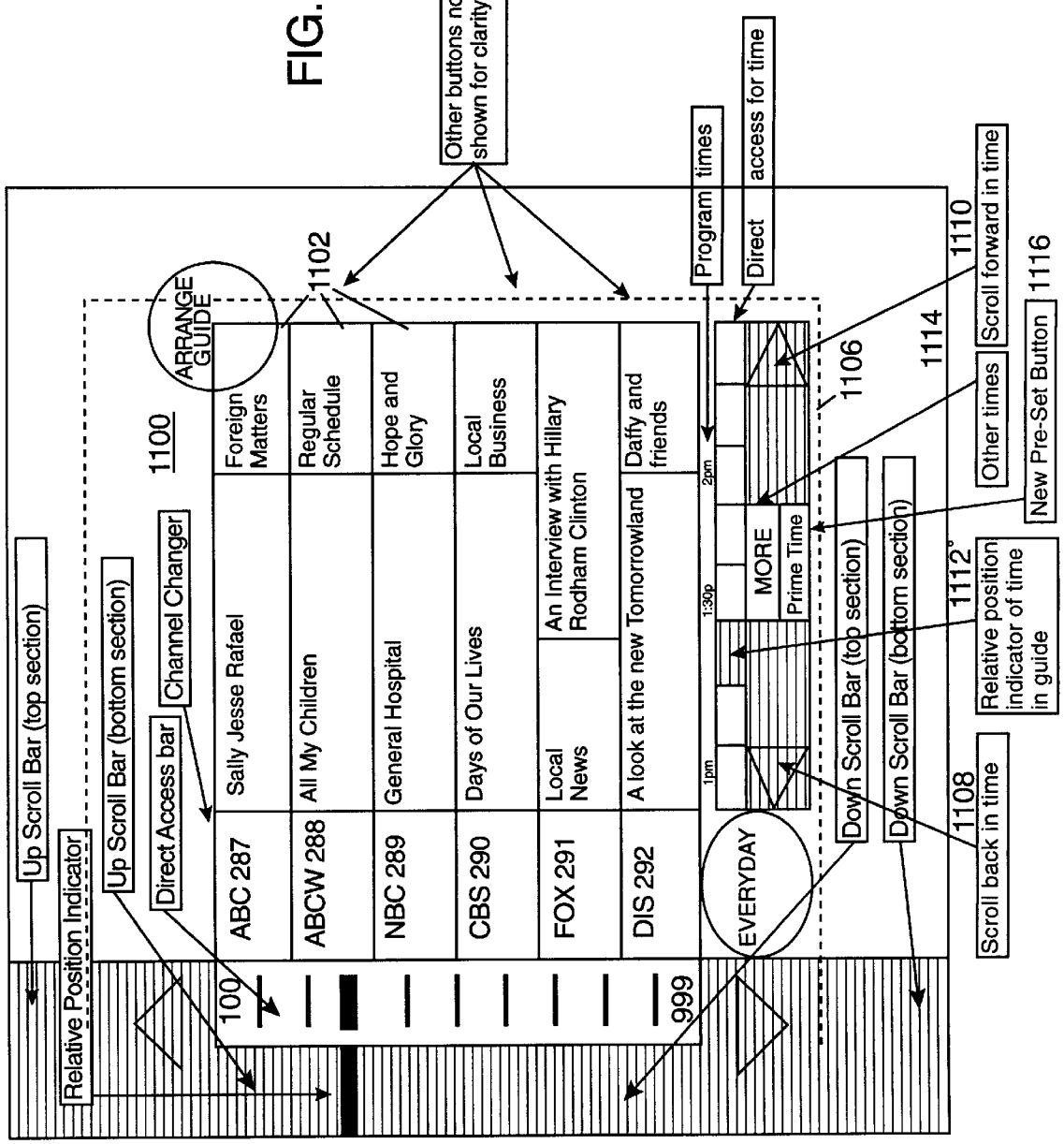
FIG. 11 is a diagram showing the program guide provided with a time preset button.

In accordance with the present invention, a simplified procedure may be carried out to display a program guide for a required time period. Referring to FIG. 11, in the program guide mode, the TV GUI may display a program guide 1100 that maintains all of the elements of the program guide 900 illustrated in FIGS. 7, 9 and 10. In particular, the program guide 1100 has a time scroll bar 1106 that enables the user to view a TV program schedule before and after the time indicated by the current program time legends on the screen. For example, FIG. 11 shows time legends 1 P.M., 1:30 P.M., and 2 P.M. indicating that the program guide 1100 displays TV program information for time slots 1:00–1:30 P.M., 1:30–2:00 P.M., and 2:00–2:30 P.M.

The user may click on scroll icons 1108 and 1110 to respectively scroll the program guide 1100 back and forward in time by a predetermined time period. For example, 4–8 hours of program information may be displayed using the icons 1108 and 1110. A relative position indicator 1112 shows the current half-hour time slot. An icon MORE 1114 on the time scroll bar 1106 may be used to switch the TV GUI into the "more times" mode illustrated in FIG. 8.

A preset button Prime Time 1116 may be provided below the MORE icon 1114 to carry out a simplified procedure of displaying a program guide for a time period preselected by the user. For example, a TV program schedule for prime time TV broadcasting from 8 P.M. to midnight may be displayed in response to a single click on the preset button 1116.

The CPU 318 is preprogrammed by the user to display the time preset button 1116 for a preselected time period. When the user clicks on the preset button 1116, the CPU 318 accesses an internal database of the current program guide to collect information on TV programs for the preselected time period. Thereafter, the CPU 318 calculates TV program boundaries for time slots of predetermined duration, for example, for 8 half-hour time slots from 8 P.M. to midnight.

The GUI displays vertical program bars 1102 for TV channels represented on the screen. For each TV channel, the program bar 1102 contains time slots showing TV programs scheduled for these time slots. For example, the first three half-hour time slots may be displayed for the selected prime time period. Program time legends 8 P.M., 8:30 P.M. and 9 P.M. are provided to show initial points of the displayed time slots. The time scroll bar 1106 on the screen enables the user to scroll the program guide 1110 TV within the preselected time period, for example, from 8 P.M. to midnight.

Thus, the preset button 1116 on the screen provides a simplified procedure for review of TV program information for any preselected time period. Although a single preset button is disclosed, it is to be understood that the present invention is applicable to a GUI including any number of preset buttons that allow TV program information for preselected time periods to be reviewed.

In summary, the results and advantages of the novel TV GUI of the present invention can now be more fully appreciated. The GUI displays a program guide that contains information on TV programming for a time period of predetermined duration. The program guide has a time scroll bar that enables a user to scroll a TV program schedule back and forward in time within the selected time period. When the user clicks on a MORE icon on the time scroll bar, the GUI switches into a "more times" mode to offer a menu of time options that represent various preselected time periods of TV programming. A preset button may be provided on the program guide to enable users to view TV program information covering any preselected time period. A single click on the preset button causes the GUI to switch to a program guide for the preselected time period.

In this disclosure, there are shown and described only the preferred embodiments of the invention, but it is to be understood that the invention is capable of changes and modifications within the scope of the inventive concept as expressed herein.

We claim:

1. A television (TV) system comprising:
   a CPU, and
   a TV monitor controlled by said CPU for displaying a TV program guide containing a first set of TV program data covering a first time interval,
   said TV program guide having a time preset graphical object responsive to a single click produced by a pointing device, the time preset graphical object enabling user access to a second set of TV program data covering a second time period preselected by a user, the preselection of the second time period being unrelated to the first time period.

2. The system of claim 1, wherein said time period is outside said time interval.

3. The system of claim 2, wherein said TV program guide includes a time scroll object for scrolling said first set of TV programs within said time interval and said time scroll object functioning in said unrelated time periods.

4. The system of claim 3, wherein said time scroll object comprises scroll icons for scrolling said first set of TV programs back and forward in time and can function at least independent of and in cooperation with said time preset graphical object.

5. The system of claim 4, wherein said TV program guide further comprises a graphical channel changer having channel objects for indicating TV channels.

6. The system of claim 5, wherein said TV monitor switches to a selected TV channel when the user clicks on a channel object representing the selected TV channel.

7. The system of claim 6, wherein said channel objects contain logos of the TV channels.

8. The system of claim 6, wherein said TV program guide further comprises an additional time object for providing user access to TV program information outside said time interval.

9. The system of claim 8, wherein a menu bar composed of time options is displayed when the user clicks on said additional time object.

10. The system of claim 9, wherein graphical configuration of said channel changer remains unchanged when said menu bar is displayed.

11. The system of claim 10, wherein said time options define various preselected time periods of TV programming.

12. The system of claim 11, wherein said TV program guide comprises graphical program bars containing information on TV programs carried by various TV channels.

13. The system of claim 12, wherein a graphical program bar that contains TV program information for a TV channel is aligned with a channel object that defines the TV channel.

14. The system of claim 13, wherein said graphical program bar is composed of time slots of predetermined duration.

15. A method of displaying TV programming information comprising the steps of:
   displaying a program guide containing TV program information for a first time interval,
   drawing on the program guide a graphical object indicating a second time period, the second time period being preset by a user and the second time period being unrelated to the first time period, and
   displaying a TV program guide for said second preset time period in response to a single click on said graphical object.

16. The method of claim 15, wherein an additional time icon is displayed on said program guide.

17. The method of claim 16, wherein a menu bar composed of a plurality of time options is displayed in response to a click on said additional time icon.

18. The method of claim 17, wherein a channel changer is displayed on said program guide.

19. The method of claim 18, wherein configuration of said channel changer remains unchanged when the menu bar is displayed.

20. A system for displaying a graphical user interface comprising:
   a CPU, and
   an indicator controlled by said CPU for displaying data relating to a first time interval of predetermined duration, and a graphical time preset button responsive to a single activation of a pointing device, the graphical time preset button switching the indicator to display data relating to a second time period preselected by a user, the second time period being unrelated to the first time period.

21. A television (TV) system comprising:
   a CPU, and
   a TV monitor controlled by said CPU for displaying a TV program guide containing a first set of TV program data covering a first time interval,
   said TV program guide displayed on said TV monitor including a plurality of time object displays each respectively representing one of a plurality of specific time intervals corresponding thereto, said plurality of specific time intervals being selected in a manner unrelated to said first time interval,
   said CPU operating in response to a selection of one of said time object displays by said CPU controlling said TV monitor to display TV program data for the respective corresponding specific time interval.

22. A television system in accordance with claim 21, wherein said CPU is responsive to a single selection of one of said time periods by controlling said TV monitor to display simultaneously TV program data from a plurality of program providers for said selected time interval.

* * * * *